UNITED STATES PATENT OFFICE.

ARTHUR LAW GRANT, OF TORONTO, CANADA, ASSIGNOR TO WILLIAM JAMES URQUHART, OF SAME PLACE.

PROCESS OF REDUCING COPPER ORE AND MATTES.

SPECIFICATION forming part of Letters Patent No. 578,817, dated March 16, 1897.

Application filed October 24, 1895. Serial No. 566,728. (No specimens.)

*To all whom it may concern:*

Be it known that I, ARTHUR LAW GRANT, of the city of Toronto, in the county of York, in the Province of Ontario, Canada, have invented a certain new and useful Improved Process of Reducing Nickel and Copper Ore and Mattes; and I do hereby declare that the following is a full, clear, and exact description of the invention, which will enable others skilled in the art to which it appertains to make and use the same.

The process hereinafter described is used in the treatment of ores containing copper and nickel, such, for example, as those found in the Sudbury district.

In the following description of the invention I refer to the ores, but wish it to be understood that I include also mattes of those ores as an equivalent material in its relation to the process.

In applying my process I first roast the pulverized ore or matte, thereby driving off the sulfur and causing the oxygen of the atmosphere to take its place and oxidizing the metals. I next add to the material treated as above described silica (preferably in the form of sand) sufficient to form fusible silicates of the metals present, and I then heat the combined mass, so as to form silicates of all the metals present. While this mass is still in the furnace and in condition, I add thereto a precipitant which frees one of the metals with, ordinarily, a small proportion of another and permits it to fall. For this purpose I use, preferably, iron; but I may use any chemical equivalent thereof. The iron fused in the mass replaces the copper in the silicate of copper and the copper is set free and thrown down. As it is my object to free the silicates from all copper, an excess of iron must be used, and as iron will also replace the nickel in the silicate of nickel (though not as readily) some nickel will also be replaced by the iron, and will thus be freed and precipitated with the copper. The copper so precipitated with what nickel it has carried with it is then drawn off. Continuing with the same heat, I now add a further quantity of iron to the silicates remaining in the furnace, from which the copper has been separated, sufficient to replace the nickel in the remaining silicates, and as an excess of iron must be used, as before, the nickel thus freed and precipitated will contain some iron. The silicate of iron remaining in the furnace is then run off from the furnace and another charge of the roasted ore or mattes, with a suitable proportion of the silica, is put into the furnace and melted. I then add to this the pig of copper and nickel first obtained in the previous operation above explained. The nickel in the copper thus added will replace an equivalent of copper in the fused silicates. The copper added, together with copper from the silicates set free by the combination of the nickel which replaces it in the silicates, will then be thrown down and is tapped off; but copper still remains in the silicates in the furnace, and to free this I add more iron sufficient to throw down all the copper, and as an excess of iron must still be used the copper now thrown down will contain some nickel, and this mass of copper with some nickel is then drawn off. I now add the pig of nickel with some iron previously obtained, as above described, to the furnace. Here the temperature of the furnace should be raised, as nickel is less easily fused than copper. The nickel of the pig just added falls, being already free. The iron of the pig displaces its equivalent of nickel in the silicates, and this displaced nickel falls with the other nickel just above referred to. We have now in the bottom of the furnace pure nickel, which is tapped off; but there remains still some nickel in the furnace combined with the silicates. I now add sufficient iron to displace this nickel in the silicate combination, and as an excess of iron must be added, as above explained, some iron will be thrown down with the nickel. This is tapped off, and the remaining slag, consisting of silicate of iron, is run off.

As the result of the operations above described we have, first, pure copper; second, clear nickel. We have also copper containing some nickel, and nickel containing some iron. This process, consisting of the successive steps above described, constitutes the complete series of steps. The copper obtained in a pure state and the nickel in the same condition are complete results, and the mixed products also obtained may be used in a repetition of the series of steps above described, or may be separately treated.

I claim—

1. The hereinbefore-described process of treating ores or mattes of copper and nickel, the same consisting in first roasting the ore or matte, next fusing it in the presence of silica and thereby reducing the copper and nickel into silicates, then precipitating the copper and part of the nickel with an excess of iron, drawing off the precipitated copper and nickel and adding another portion of iron to the silicates remaining in the furnace and finally drawing off the precipitated nickel and iron.

2. The hereinbefore-described process of treating ores or mattes of copper and nickel, the same consisting in first roasting the ore or mattes, next fusing it in the presence of silica and thereby reducing the copper and nickel into silicates, then precipitating the copper and part of the nickel with an excess of iron, drawing off the precipitated copper and nickel, then adding another portion of iron to the silicates remaining in the furnace and drawing off the precipitated nickel and iron, supplying a fresh charge of roasted ore or matte to the furnace, adding thereto the precipitated alloy of copper and nickel and finally drawing off the precipitated copper.

3. The hereinbefore-described process of treating ores or mattes of copper and nickel, the same consisting in first roasting the ore or mattes, next fusing it in the presence of silica and thereby reducing the copper and nickel into silicates and then precipitating the copper and part of the nickel with an excess of iron, drawing off the precipitated copper and nickel, then adding another portion of iron to the silicates remaining in the furnace, and drawing off the precipitated nickel and iron, supplying a fresh charge of roasted ore or mattes to the furnace, adding thereto the precipitated alloy of copper and nickel, drawing off the precipitated copper and then adding more iron sufficient to displace the remaining copper and part of the nickel and finally drawing off the precipitated copper and nickel.

4. The hereinbefore-described process of treating ores or mattes of copper and nickel, the same consisting in first roasting the ore or mattes, next fusing it in the presence of silica and thereby reducing the copper and nickel into silicates, then precipitating the copper and part of the nickel with an excess of iron, and drawing off the precipitated copper and nickel, and then adding another portion of iron to the silicates remaining in the furnace, and drawing off the precipitated nickel and iron, supplying a fresh charge of roasted ore or matte to the furnace, adding thereto the precipitated alloy of copper and nickel and drawing off the precipitated copper, next adding more iron sufficient to displace the remaining copper and part of the nickel, drawing off the copper and nickel and finally adding a pig of nickel and iron and drawing off the precipitated nickel.

5. The hereinbefore-described process of treating ores or mattes of copper and nickel, the same consisting in first roasting the ore or mattes, next fusing it in the presence of silica and thereby reducing the copper and nickel into silicates, then precipitating the copper and part of the nickel with an excess of iron, and drawing off the precipitated copper and nickel, then adding another portion of iron to the silicates remaining in the furnace and drawing off the precipitated nickel and iron, supplying a fresh charge of roasted ore or matte to the furnace, adding thereto the precipitated alloy of copper and nickel and drawing off the precipitated copper, next adding more iron sufficient to displace the remaining copper and part of the nickel, drawing off the copper and nickel, adding a pig of nickel and iron and drawing off the precipitated nickel and finally adding sufficient iron to displace the remaining nickel, and drawing off the precipitated nickel and iron.

ARTHUR LAW GRANT.

Witnesses:
B. BOYD,
E. R. CASE.